Figure 1:
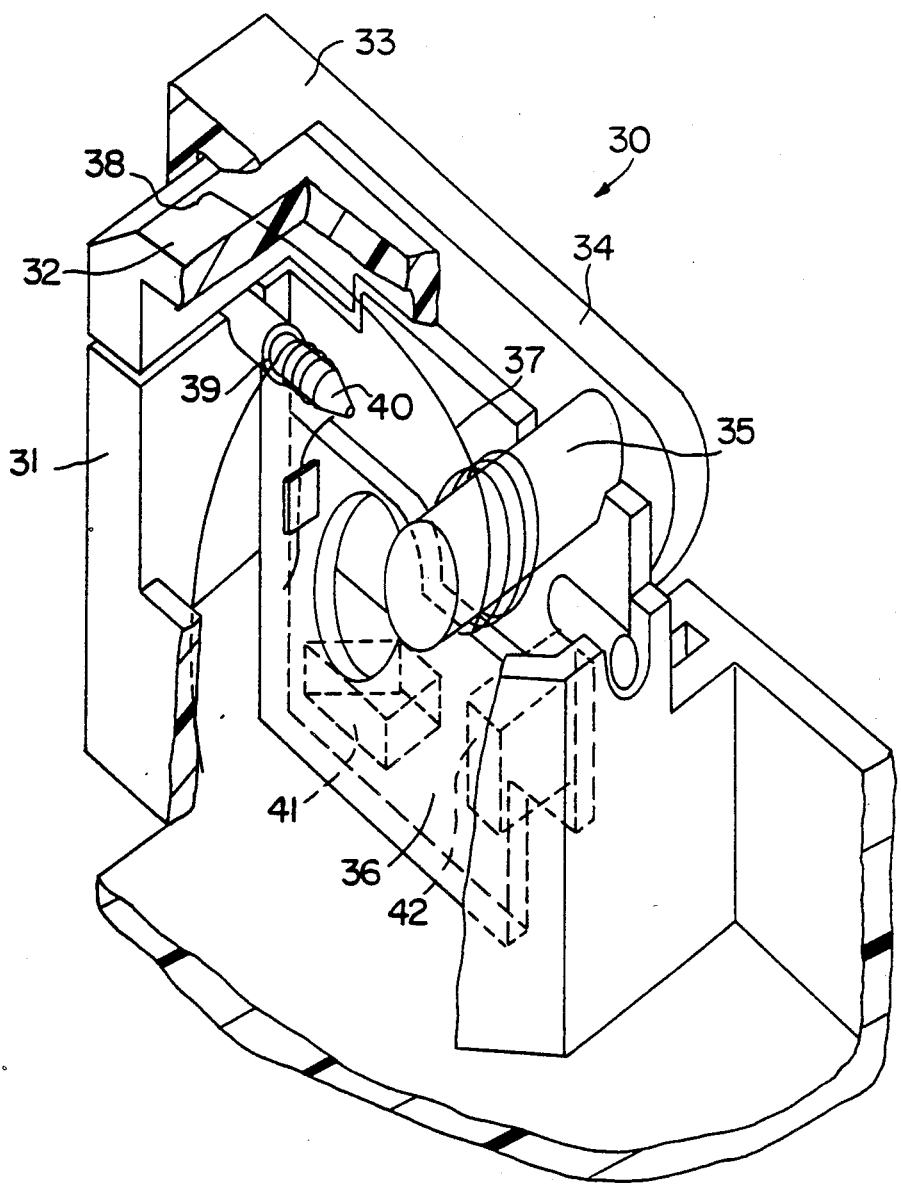

United States Patent [19]

Schoettle et al.

[11] Patent Number: 5,002,239
[45] Date of Patent: Mar. 26, 1991

[54] LOCKING/UNLOCKING MEANS FOR A CASSETTE, AND A CASSETTE HAVING THIS MEANS

[75] Inventors: Klaus Schoettle, Heidelberg; Lothar Gliniorz, Frankenthal; Juergen Dreyer, Willstaett; Kurt Schmidts, Schwanau, all of Fed. Rep. of Germany

[73] Assignee: BASF Aktiengesellschaft, Ludwigshafen, Fed. Rep. of Germany

[21] Appl. No.: 279,020

[22] Filed: Dec. 2, 1988

[30] Foreign Application Priority Data

Dec. 3, 1987 [DE] Fed. Rep. of Germany ... 8715990[U]

[51] Int. Cl.$^5$ ............................................. G11B 23/087
[52] U.S. Cl. .................................................... 242/198
[58] Field of Search ................................ 242/197–199; 360/132

[56] References Cited

U.S. PATENT DOCUMENTS 4,466,583 8/1984 Giannis et al. ...................... 242/198
4,475,700 10/1984 MacLeod, Jr. et al. ............ 242/197

FOREIGN PATENT DOCUMENTS 8504032 5/1985 Fed. Rep. of Germany.

Primary Examiner—David Werner
Attorney, Agent, or Firm—Keil & Weinkauf

[57] ABSTRACT

A locking/unlocking means for cassettes, in particular those having swivel cover flaps, consists partially or completely of elastically deformable material and is pivotably mounted at two or more points. In the rest position of the locking/unlocking means, advantageously a swivel plate, an essentially tension-free arrangement is obtained by means of a supporting extension above the bearing axis, by actuation from outside, the said arrangement being converted in the operating state, without further spring elements, into a state of tension and into a position in which the supporting extension rests against the inside of an outer cassette wall and a reaction force corresponding to the actuating force is generated without any additional spring. Such a locking/unlocking means is suitable for cassettes of all types.

13 Claims, 5 Drawing Sheets

LOCKING/UNLOCKING MEANS FOR A CASSETTE, AND A CASSETTE HAVING THIS MEANS

The present invention relates to a locking means for a cassette and to a cassette having the said means, consisting of a swivel element which is pivotable about a bearing axis of a bearing means and of a locking device arranged thereon below the bearing axis, the bearing means interacting with walls of the cassette housing and the swivel element consisting at least partially of elastically deformable material and the locking device being arranged so that it can be caused to pivot.

A locking/unlocking means is known in which a rotatably mounted locking plate is supported against the cassette housing by means of a separate leg spring fastened to the said plate, in order to produce initial tension in the locking position. A directly locking projection on the locking plate engages a recess in a swivel flap of the cassette in the locking position, and another projection on the locking plate is actuated to trigger the locking plate from outside the housing, and the locking plate is thus rotated against the initial tension and releases the swivel flap to allow it to rotate upward and open the cassette (for this prior art, see FIG. 1).

U.S. Pat. No. 4,466,583 and German Utility Model 85 04 032 disclose a further locking flap for the same purpose, the leg spring of the above prior art being replaced by an integral, molded plastic leg spring. This embodiment of an integral plastic spring is also disadvantageous owing to the complicated and expensive manufacture, which requires expensive molds, and because of the projecting plastic springs, which become caught up and thus hinder further processing and finishing (assembly) of the cassettes.

It is an object of the present invention to avoid the disadvantages of the known locking/unlocking means and cassettes, to make their production more economical and to extend their life.

We have found that this object is achieved by a locking/unlocking means for a cassette consisting of a swivel element which is pivotable about a bearing axis of a bearing means and of a locking device arranged thereon below the bearing axis, the bearing means interacting with walls of the cassette housing and the swivel element consisting at least partially of elastically deformable material and the locking device being arranged so that it can be caused to pivot, wherein the swivel element has a supporting extension above the bearing axis, and, in the rest position, the swivel element with the supporting extension and/or a part below the bearing axis is in contact, essentially without tension, with the inside of the outer wall, and, in the operating position, when the locking device is actuated, the swivel element pivots into a state of tension and into a position in which the supporting extension is in contact with the inside of the outer housing wall and the lower part of the swivel element is no longer in contact with the housing wall.

This ensures that the swivel element rests against the housing wall just without any, or with virtually minimal, play or contact pressure. In its rest position, in which the locking device is not actuated, the swivel element is subjected to virtually no load and is completely free of tension in the cassette, which may be, for example, a VHS video cassette. Out of a storage time or useful life of about 5–10 years, such a cassette is in operation for scarcely more than 100–200 hours, ie. it is only during this relatively short time that this swivel element is subjected to a load against its supporting extension, which acts as an abutment. In contrast, the thin integrally molded plastic springs of the prior art are under load during the entire life of the cassettes and will therefore eventually become weak, even in the case of very resilient, thin thermoplastic material, ie. the spring properties change since the thermoplastic flow of these plastic materials is load-dependent and time-dependent.

In the locking/unlocking means of the present invention, it has been found, surprisingly, that, by arranging the supporting extension directly above the bearing axis, the internal resilience of the swivel element between the bearing points of the bearing means is sufficient to apply a spring force in the region of rotation of the swivel element, ie. during and after its actuation, in order to maintain the locking function in the rest position of the said element and to apply the necessary initial tension or spring force in the operating position.

In practice, every contact point between the swivel element and the housing wall is provided a distance away from the bearing axis. Advantageously, the at least one supporting extension can be located substantially in the middle between bearing elements of the bearing means. This permits subsequent installation in exisiting VHS cassettes and furthermore a substantially symmetrical application of force is ensured.

In an advantageous embodiment, the swivel element is in the form of a swivel plate.

In a practical embodiment, the distances of the contact points of the supporting extension and of the lower part of the swivel plate from the bearing axis should have a ratio of from 1:12 to 1:6, with the result that, for conventional dimensions of the swivel plate and known thermoplastic materials, forces of the desired magnitudes are achievable. In practice, the supporting extension may be thicker at the free end toward the outer housing wall, resulting in an annular position of the swivel plate.

In the rest position of the swivel plate, the angle between the said plate and the outer housing wall may be from about 0.5° to about 1.5°. In another practical embodiment, the swivel plate can be provided with a frame-like reinforcement which extends as far as the bearing elements of the bearing means, and the swivel plate, between the bearing elements and including the supporting extension, can be thinner than the frame reinforcement and thus flexible.

A cassette, in particular video cassette, having a locking/unlocking means for a cassette flap may advantageously have the features of the patent claims for said locking/unlocking means.

In particular, it is practical if the swivel element is in the form of a swivel plate.

Regarding practical dimensions, it is also considered important to ensure that the distance from the bearing axis to the first contact point between the supporting extension of the swivel element and the housing wall (15) of the cassette and the distance from the bearing axis to the second contact point between the lower part of the swivel element and the housing wall have a ratio of from 1:6 to 1:12.

In a practical embodiment, the swivel element and bearing in the cassette housing are designed so that, in the rest position of the swivel element, the angle between the swivel element and the outer wall if from about 0.5° to about 1.5°.

The invention is described below with reference to embodiments shown in the drawings.

Figure 2:
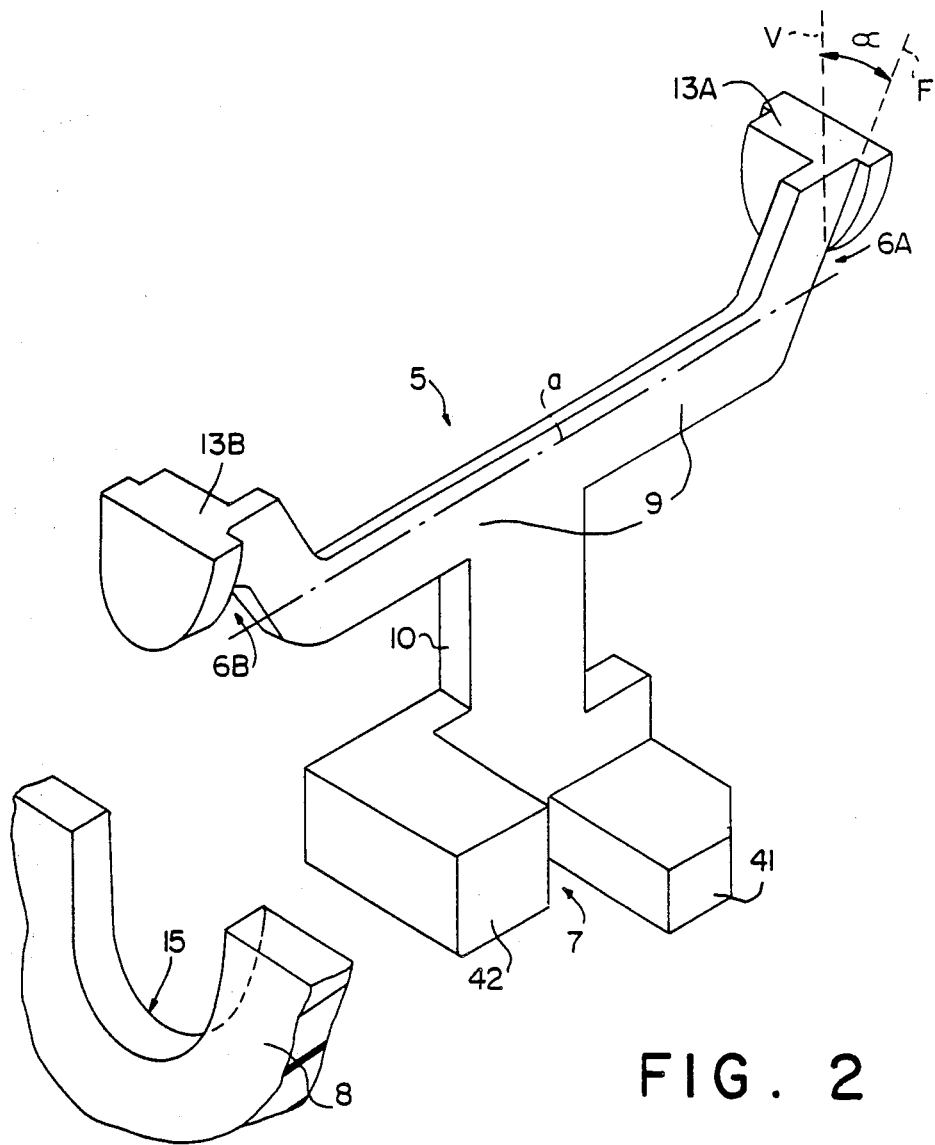
Figure 3:
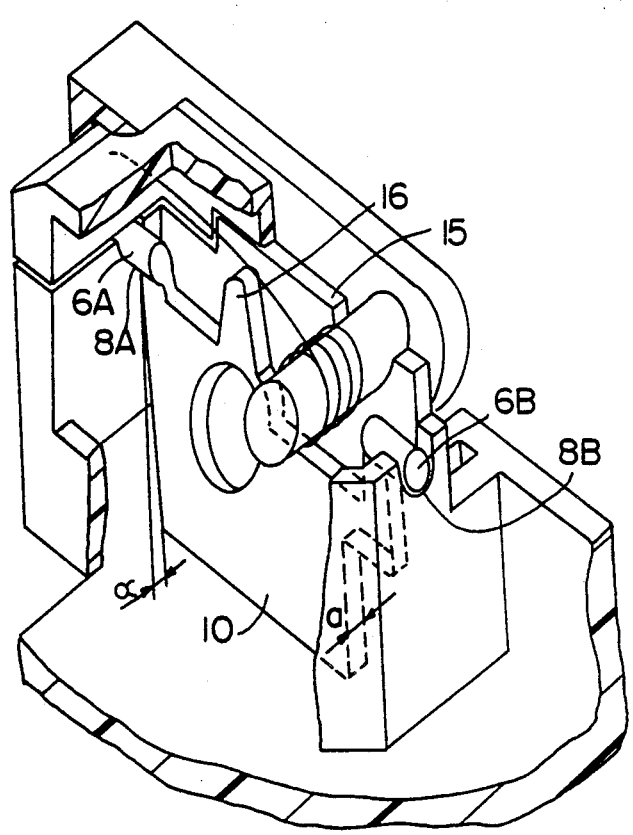
Figure 3A:
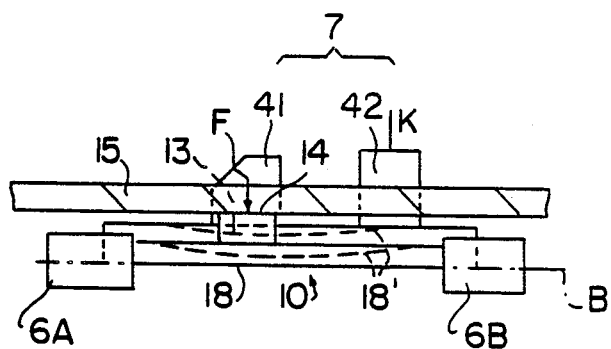
Figure 4:
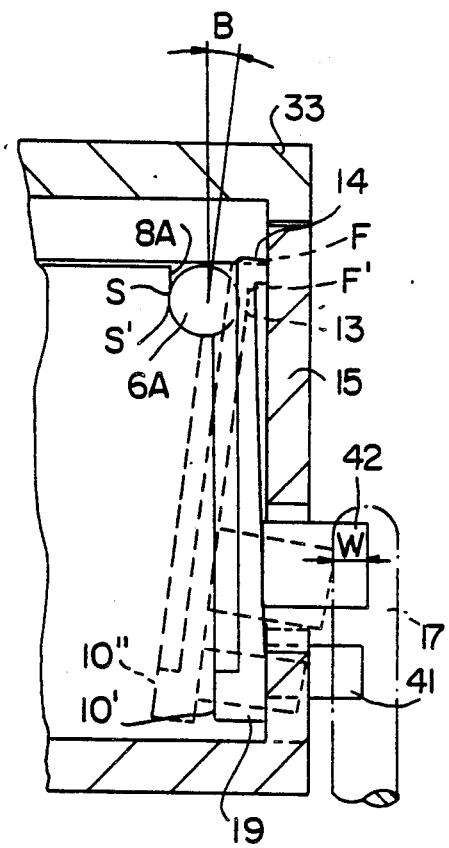
Figure 5:
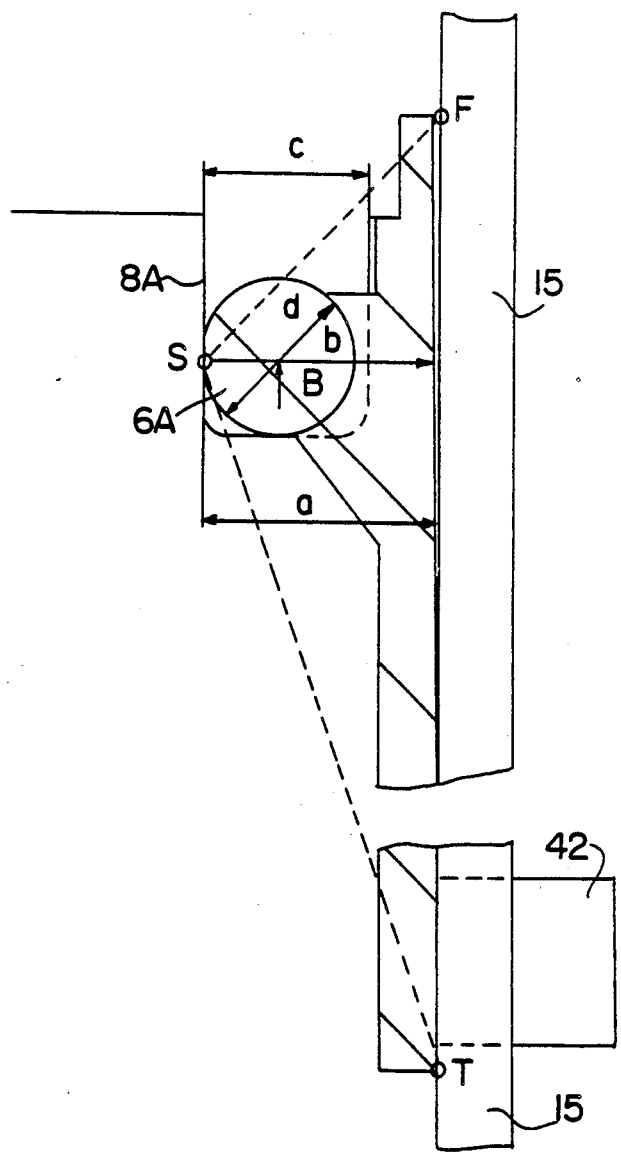

FIG. 1 shows the prior art of a locking/unlocking arrangement, partially cut away, FIG. 2 shows the same front corner part with a locking/unlocking means having a swivel plate with integral spring, FIG. 3 shows a second embodiment of the swivel plate having an integral spring, FIG. 3A shows a plan view of the swivel plate according to FIG. 2, FIG. 4 shows a side view of the locking/unlocking means of FIG. 2 in the rest position and operating position of the swivel plate and FIG. 5 shows a magnified section of FIG. 4, partially in cross-section.

FIG. 1 shows a front corner part 30 of a VHS cassette, consisting of lower and upper housing parts 31, 32, which are suitably connected to one another. The tape, which is not shown, is protected from damage by means of a swivel date 33 having side walls 34 whose inner surfaces are provided with injection molded pins 35, around the axis of which the swivel flap is rotatable. In the lower housing part 31, a rotatable locking plate 36 is provided, the said plate permitting locking by means of a projection 41 which engages a recess (not shown) in the side wall 34 of the flap. The swivel plate 33 having side walls 34 is held under initial tension against the housing parts 31, 32 in the closed position by means of a leg spring 37 which is provided on a peg 35 and whose leg 38 engages the swivel flap 33 from below. The locking plate 36 is held under initial tension in its locking position by means of a further leg spring 39 which is arranged on a bearing journal 40 of the locking plate 36 and whose leg is supported against a rib of the bottom part 31 of the housing. The locking plate 36 is also provided with a relatively large actuating projection 42, which can be actuated from outside the cassette.

FIG. 2 shows a locking/unlocking means according to the present invention. For the sake of clarity, the leg springs 37 have been omitted. The swivel plate 10 is provided with a frame 11 and has at its foot, together with the locking device 7, formed of projections 41 and 42, which are shown in FIG. 4, means for locking or for actuating the locking/unlocking means from outside the cassette. At the upper end of the swivel plate 10, cylindrical bearing elements 6A and 6B are provided on the right and left, which form part of the bearing means. It is also possible to use a common cylindrical axis as a bearing means. Bearing apertures 8A and 8B cooperating with bearing element 6A and 6B are provided in the outer cassette wall 9 and in the inner wall 12, respectively. The bearing axis, that is the axis of pivoting of the swivel plate 10, is denoted by B. One or more supporting extensions 13, which in this case are in the form of a nose and have a cam 14 on the free end, as a thickening of the material, to maintain the distance from the outer side wall 15, are provided roughly in the middle between the bearing elements 6A and 6B (cf. FIG. 3A). The contact point between the cam 14 and the inside of the outer side wall 15 is denoted by F.

FIG. 3 shows the swivel plate 10 with a uniform thickness (without frame 11). The supporting extension 16 in this case is wedge-shaped, with the major part of the material being at the free end. FIG. 3A shows a plan view of the swivel plate 10 in its embodiment and arrangement of FIG. 2. The bending lines 18' drawn in show the flexible part 18 when the force K is applied at the actuating projection 42, and the effect obtained when the cam 14 on the supporting extension 13 rests against the inside of the outer wall 15 at the contact point F.

As more clearly shown in FIG. 5, it is necessary for the contact point S of the cylindrical bearing element 6A and 6B to be provided at a distance b from that side of the swivel plate 10 which faces the outer wall 9, the distance a of the outer wall itself being equal to or slightly larger than b. In practice, a−b (a minus b) should be about 0–0.2 mm. This defines the angular position of the swivel plate 10 in the rest position and the extent of deflection in the operating position.

It is also necessaty to dimension the lateral play c of the cylindrical element 6A, 6B in the bearing apettures 8A and 8B so that c−d≧0.2 mm, where d is the cylinder diameter. This makes it possible to ensure that, with the usual tolerances and normal flexibilty of the swivel plate 10, there is no jamming of the bearing means 6.

FIG. 5 shows that contact points are present at S and F. In adition, however, it is also possible for a contact point T to be present, in addition to the contact point F, on the lower edge 19 of the swivel plate 10, for example as shown in FIG. 4, where only a cam 14 and the lower edge 19 are used as contact parts themselves. Where spacing cams are used, the distance b to the front contact end of the cam must be calculated, and the above dimensioned specifications should be observed.

FIG. 4 shows the swivel plate 10 having the spacing cam 14 on the supporting extension 13 in the rest position 10' and operating position 10''. While in the rest position 10' (FIGS. 2 and 3) the deflection angle $\alpha$ from the vertical is about 0.5 to about 1.5°, which is also determined by the cam dimensions, in the operating position the deflection angle $\beta$ is about 10°. In general, $\beta$ must be 5 to about 20°, which of course depends on the form and actuation path W of the locking device, in particular of the actuating projection 42 due to the actuating peg 17.

In the position 10'' of the swivel plate 10, deflected by the angle $\beta$ of, for example, 10°, the position of the peg 6A has changed slightly (displacment of the contact points S' to S''), and consequently the contact point of the cam 14 has also shifted from F to F'. In this position 10'' of the swivel plate 10, it dislays its full resilience and flexibility, which are determined in the embodiment of FIG. 2 by the region of reduced thickness m, 18 between fram 11 and bearings 6A, 6B, and by the supporting extension 13. The thickness of the frame part 11 is denoted by r. In the VHS system, the deflection force is specified as being smaller than 15 pond $\cong$ 15 cN. For actuation, the embodiment shown in FIGS. 3 and 3A requires a relatively small deflection force K of about 8 to 12 cN (centi Newton) for one of the following materials: polyoxymethylene (POM), polystyrene (PS), polypropylene (PP) or (ABS), and, in the case of POM, with a swivel plate thickness of 1 to 2 mm. Because of the required flexible properties, the stated materials must have a modulus of elasticity of from 2,500 to 3,500, preferably about 3,000, N/mm$^2$ (Newton per square millimeter). The forces which have been applied over the swivel plate 10 are predominantly bending forces. Of course, reaction forces of such swivel plates or similar locking or braking elements can also be in the region of about 1 cN to 30 cN or more, particularly in the case of different dimensions and space conditions.

The invention is described for video cassettes. However, the locking/unlocking means can also advantageously be used for any type of cassettes having an automatic unlocking/locking means in the recorder. Cassettes of this type include audio, data, film and disc cassettes.

We claim:

1. A locking/unlocking means for a cassette housing having inner and outer housing walls, said locking/unlocking means comprising a swivel element consisting at least partially of elastically deformable material, and said swivel element having bearing means pivotably mounted in said housing walls, and a locking device carried by said swivel element below the axis of said bearing means, the swivel element having a supporting extension above the bearing axis and a contact portion below said axis, and in the rest position the swivel element with the supporting extension and/or with said contact portion below the bearing axis being in contact, essentially without tension, with the inside of the outer housing wall, and in the operating position, when the locking device is actuated, the swivel element pivoting into a state of tension and into a position in which the supporting extension is in contact with the inside of the outer housing wall and said contact portion of the swivel element below the bearing axis is no longer in contact with the housing wall.

2. A locking/unlocking means as claimed in claim 1, wherein each contact point between the swivel element and the housing wall is provided at a distance from the bearing axis.

3. A locking/unlocking means as claimed in claim 2, wherein the at least one supporting extension is arranged essentially in the middle between the bearing elements of the bearing means.

4. A locking means as claimed in claim 2, wherein the distance of the contact points of the supporting extension and of said contact portion of the swivel element below the bearing axis, from the bearing axis have a ratio of about 1:6 to 1:12.

5. A locking means as claimed in claim 1, wherein the supporting extension is thicker at the free end toward the outer housing wall.

6. A locking means as claimed in claim 1, wherein, in the rest position of the swivel element, the angle between the swivel element and the outer wall is from about 0.5° to about 1.5°.

7. A locking/unlocking means as claimed in claim 1, wherein the swivel element is in the form of a swivel plate.

8. A locking/unlocking means as claimed in claim 1, wherein the swivel element is a swivel plate which is provided with a frame-like reinforcement and extends to the bearing elements of the bearing means, and the region of the swivel plate between the bearing elements, including the supporting extension, is thinner than the frame reinforcement and is thus flexible.

9. A locking/unlocking means as claimed in claim 1, wherein the at least one supporting extension is arranged essentially in the middle between the bearing elements of the bearing means.

10. A cassette, particularly a video cassette, having a housing with inner and outer walls, a cassette flap and a locking/unlocking means for said flap, said locking/unlocking means comprising a swivel element consisting at least partially of elastically deformable material, and said swivel element having bearing means pivotably mounted in said housing walls, and a locking device carried by said swivel element below the axis of said bearing means, the swivel element having a supporting extension above the bearing axis and a contact portion below said axis, and in the rest position the swivel element with the supporting extension and/or with said contact portion below the bearing axis being in contact, essentially without tension, with the inside of the outer housing wall, and in the operating position, when the locking device is actuated, the swivel element pivoting into a state of tension and into a position in which the supporting extension is in contact with the inside of the outer housing wall and said contact portion of the swivel element below the bearing axis is no longer in contact with the housing wall.

11. A cassete as claimed in claim 10, wherein the swivel element is in the form of a swivel plate.

12. A cassette as claimed in claim 10, wherein the distance form the bearing axis to the contact point between the supporting extension of the swivel element and the wall of the cassette housing and the distance from the bearing axis to the contact point between the lower contact portion of the swivel element and the wall of the cassette housing have a ratio of from 1:6 to 1:12.

13. A cassette as claimed in claim 10, wherein, in the rest position of the swivel element, the angle between the swivel element and the outer wall is from about 0.5° to 1.5°.

* * * * *